United States Patent [19]
Schiffleger

[11] Patent Number: 5,526,487
[45] Date of Patent: Jun. 11, 1996

[54] SYSTEM FOR MULTIPROCESSOR COMMUNICATION

[75] Inventor: Alan J. Schiffleger, Chippewa Falls, Wis.

[73] Assignee: Cray Research, Inc., Eagan, Minn.

[21] Appl. No.: 308,401

[22] Filed: Feb. 9, 1989

[51] Int. Cl.$^6$ .................................. G06F 15/163
[52] U.S. Cl. .................. 395/821; 395/800; 364/DIG. 1
[58] Field of Search .................. 364/200 MS File, 364/900 MS File; 395/800, 200, 275

[56] References Cited

U.S. PATENT DOCUMENTS

| | | |
|---|---|---|
| 3,348,210 | 12/1964 | Ochsner . |
| 3,735,360 | 5/1973 | Anderson et al. . |
| 3,833,889 | 9/1974 | Cray . |
| 3,916,383 | 10/1975 | Malcolm . |
| 4,073,003 | 2/1978 | Chambers . |
| 4,128,880 | 12/1978 | Cray, Jr. . |
| 4,212,037 | 7/1980 | Lemelson . |
| 4,280,176 | 7/1981 | Tan . |
| 4,293,941 | 10/1981 | Muroka et al. . |
| 4,310,879 | 1/1982 | Pandeya . |
| 4,400,771 | 8/1983 | Suzuki et al. . |
| 4,412,285 | 10/1983 | Neches et al. ............. 395/200 |
| 4,435,765 | 3/1984 | Uchida et al. . |
| 4,489,381 | 12/1984 | Lavallee et al. . |
| 4,543,630 | 9/1985 | Neches ...................... 395/200 |
| 4,563,738 | 1/1986 | Klan . |
| 4,594,657 | 6/1986 | Byrns ........................ 395/200 |
| 4,636,942 | 1/1987 | Chen et al. . |
| 4,661,900 | 4/1987 | Chen et al. . |
| 4,667,287 | 5/1987 | Allen et al. ................ 395/200 |
| 4,745,545 | 5/1988 | Schiffleger . |
| 4,754,398 | 6/1988 | Pribnow . |
| 4,925,311 | 5/1990 | Neches et al. ............. 395/200 |
| 4,942,574 | 7/1990 | Zelle ........................ 370/85.15 |
| 4,951,193 | 8/1990 | Muramatsu et al. ....... 395/650 |
| 4,965,718 | 10/1990 | George et al. ............ 395/200 |
| 5,067,071 | 11/1991 | Schanin et al. ........... 395/275 |

*Primary Examiner*—William M. Treat
*Attorney, Agent, or Firm*—Schwegman, Lundberg & Woessner

[57] ABSTRACT

A system for interprocessor communication including a shared register resource accessible by any one of the processors through the using internal communication paths. The shared register resource is distributed among the processors with each processor including a portion of the total system resource. Each processor includes an access circuit for receiving instructions from the CPU and generating control bytes to be distributed to the shared register resource circuits in each of the processors, which use the control byte to control shared resource access. Each shared register resource circuit is capable of controlling the I/O channels associated with its respective processor. A local access circuit for each CPU is capable of obtaining access to and controlling any of the I/O channels in the system via the shared register resource circuits.

12 Claims, 2 Drawing Sheets

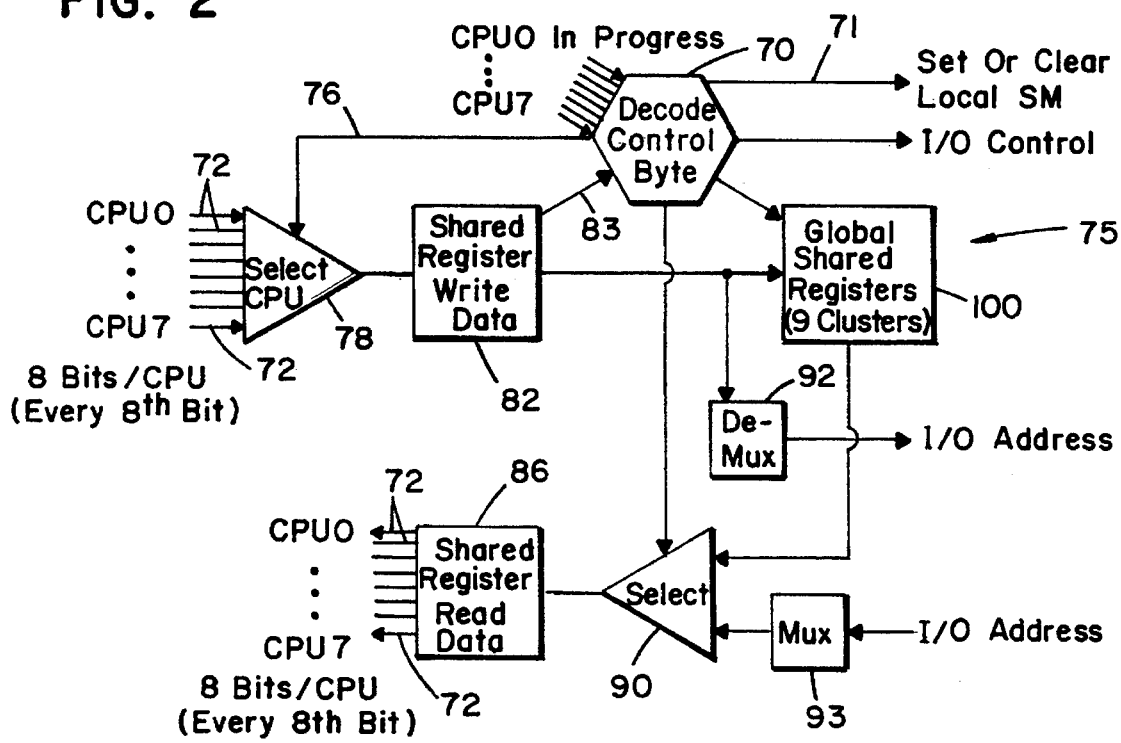

FIG. 2

FIG. 3A — Shared Register Operation

| Bit Position | CP1 | CP2 |
|---|---|---|
| $2^0$–$2^7$ | CB0 | $2^0$–$2^7$ |
| $2^8$–$2^{15}$ | CB1 | $2^8$–$2^{15}$ |
| $2^{16}$–$2^{23}$ | CB2 | $2^{16}$–$2^{23}$ |
| $2^{24}$–$2^{31}$ | CB3 | $2^{24}$–$2^{31}$ |
| $2^{32}$–$2^{39}$ | CB4 | $2^{32}$–$2^{39}$ |
| $2^{40}$–$2^{47}$ | CB5 | $2^{40}$–$2^{47}$ |
| $2^{48}$–$2^{55}$ | CB6 | $2^{48}$–$2^{55}$ |
| $2^{56}$–$2^{63}$ | CB7 | $2^{56}$–$2^{63}$ |

FIG. 3B — I/O Operation

| | CP1 | CP2 | CP3 | CP4 | CP5 | CP6 |
|---|---|---|---|---|---|---|
| CB0 | | $Aj2^0$ | $Ak2^0$ | $Ak2^2$ | $Ak2^4$ | $Ak2^6$ |
| CB1 | $2^1$ | $2^1$ | $2^3$ | $2^5$ | $2^7$ | |
| CB2 | $2^2$ | $2^8$ | $2^{10}$ | $2^{12}$ | $2^{14}$ | |
| CB3 | $2^3$ | $2^9$ | $2^{11}$ | $2^{13}$ | $2^{15}$ | |
| CB4 | $2^4$ | $2^{16}$ | $2^{18}$ | $2^{20}$ | $2^{22}$ | |
| CB5 | — | $2^{17}$ | $2^{19}$ | $2^{21}$ | $2^{23}$ | |
| CB6 | — | $2^{24}$ | $2^{26}$ | $2^{28}$ | $2^{30}$ | |
| CB7 | — | $2^{25}$ | $2^{27}$ | $2^{29}$ | $2^{31}$ | |

SYSTEM FOR MULTIPROCESSOR COMMUNICATION

TECHNICAL FIELD OF THE INVENTION

The present invention pertains to the field of high-speed digital data processors, and more particularly to multiprocessor systems.

BACKGROUND OF THE INVENTION

U.S. Pat. Nos. 4,636,942 and 4,754,398 disclose tight-coupling communication schemes for use in interprocessor communication in a multiprocessor system. These tight-coupling communication schemes provides a set of shared registers which may be accessed by the CPUs at rates commensurate with intra-CPU operation. The shared registers thus provide a fast inter-CPU communication path to minimize overhead for multi-tasking of small tasks with frequent data interchange. The scheme also provides that tasks may be coupled through the shared memory in the multiprocessor system, as accomplished in conventional interprocessor communication schemes. These patents also disclose a scheme in which tile shared registers are organized to provide N+1 "clusters", where N equals the number of processors in the system. Processors are allowed access to the shared registers according to which cluster they are assigned to. A semaphore register in each cluster provides means for synchronizing access to the clusters between the processors. The entire disclosure of each of the above-identified patents are hereby incorporated herein by reference. Further information on the basic concept outlined above may be had with respect to these patents.

SUMMARY OF THE INVENTION

The present invention provides an interprocessor communication system and method for a multiprocessor data processing system. The interprocessor communication system includes a common shared resource circuit having a plurality of clusters, access control means for limiting access by each processor to registers within a single cluster, means for issuing instructions to access common semaphore and information registers in the common shared resource circuit, and local control means connected to each processor and in relatively close proximity to its respective processor as compared to the common shared resource circuit. The local control means includes a local semaphore register, means for updating the contents of the local semaphore register in response to changes in one of the common semaphore registers, issue control means for monitoring and controlling the issue of instructions requiring access to the common shared resource circuit from the processor, data control means for transferring data from its respective processor to a common register or from a common register to its respective processor and control packet means for developing a control packet based on an issued instruction from its respective processor, said control packet being sent to said common shared resource circuit in order to gain access to said common shared resource circuit by the processor.

According to another aspect of the present invention, an interprocessor communication system for transferring data and synchronizing activity between processors in a multi-processor data processing system of N processors is formed by providing a common shared resource circuit including shared semaphore registers and shared information registers, partitioning the common shared resource circuit into resource circuit blocks such that 1/N of the bits in each information register is placed in each block and a block is placed in relatively close proximity to each processor as compared to the other processors, providing local control means connected to each processor wherein said local control means is placed in relatively close proximity to its respective processor as compared to the remaining processors and said local control means coordinates communication between its respective processor and the common shared resource circuit and connecting the local control means and the common shared resource circuit in order to transfer commands and data between the local control means and the common shared resource circuit.

According to yet another aspect of the present invention, a shared register can be accessed by testing a bit in a local semaphore register associated with the desired information register and, if the bit is set waiting until the bit is cleared. If the bit is not set, setting the corresponding bit in the shared semaphore register associated with the desired information register, accessing the desired information register through the local control means and then clearing the set bit.

BRIEF DESCRIPTION OF THE DRAWINGS

In the drawings.

FIG. 2 is a block diagram of the common shared register resource circuitry according to the present invention; and FIGS. 3A and 3B is a table illustrative of the operation of the circuitry of FIG. 1 and FIG. 2.

DETAILED DESCRIPTION OF THE INVENTION

Figure 1:
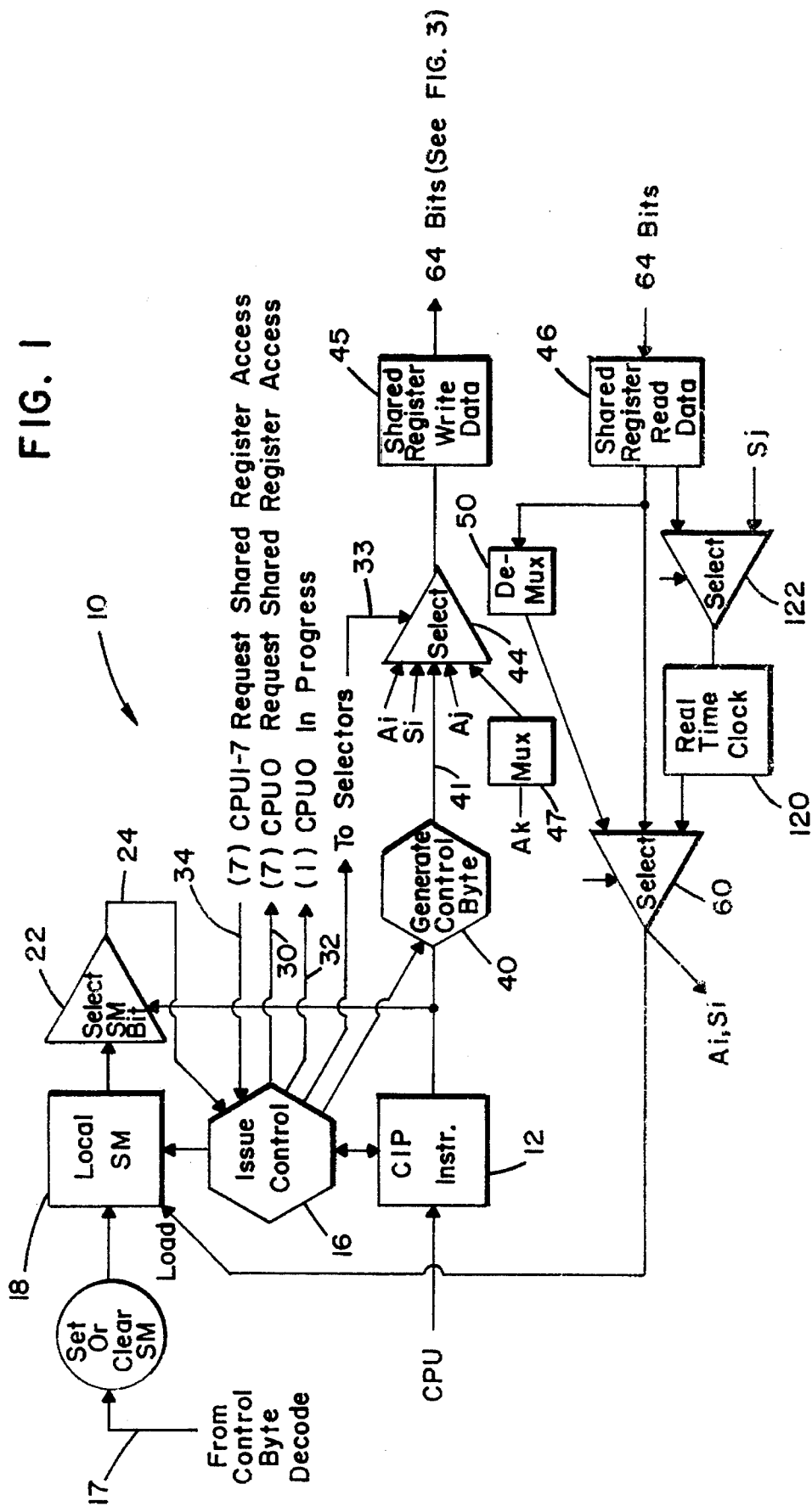
FIG. 1 is a simplified schematic block diagram of the local shared register access circuitry of according to the present invention.

Referring now to FIG. 1, there is shown a shared register access circuit 10. Each CPU in the multiprocessor system in which the present invention is employed includes a copy of this circuit. Generally, circuit 10 performs and controls the execution of CPU instructions which require access to the shared registers 100 (FIG. 2) of the system. As will be described in more detail below, certain of this control function is performed in addition in the circuitry of FIG. 2. Each CPU has internal communication paths (paths $A_I$, $S_I$, $A_J$ and $A_K$) connected directly to the access circuit 10, wherein addresses, scalar values and other data is input and received from the circuit. This data is passed through circuit 10 as it travels to and from the shared registers 100.

Discussing now circuit 10 in more detail, a CIP instruction register 12 is provided, and receives instructions from its associated CPU relating to access to the shared registers. An issue control circuit 16 is connected to register 12 and generally provides for controlling the issuance of instructions held in CIP register 12 according to the availability of the shared registers and the status of semaphore bits held in the shared registers. A copy of the semaphore bits associated with the CPU (by designation of cluster number) is held in local semaphore register 18. In one typical operation, an access to the shared registers by a CPU begins with a "test and set" instruction which tests the status of a particular semaphore bit held in local semaphore register 18. As is similarly provided in the above referenced patents, local semaphore register 18 holds a copy of semaphore bits held in a 32 bit semaphore register in the cluster assigned to the CPU. The "master" or "common" copy of the semaphore bits is held in a semaphore register in shared registers 100. The local copy of the semaphore bits provides that if a "clear" bit is to be tested and set, issue control 16 can test the bit in the local copy and proceed immediately without the delay associated with the propagation delays which are encountered in accessing the common semaphore register in global shared registers 100.

To test a bit, a select semaphore bit gate 22 is provided, and receives an input from the CIP instruction register 12 which causes it to select the appropriate semaphore bit being sought for testing. This semaphore bit is then fed back to issue control 16 over line 24, thus providing that issue control 16 can test a local semaphore bit. Since no more than one CPU can access the global shared registers 100 at any given time, issue control 16 and other associated circuitry to be described provides for gaining exclusive access to the shared registers and for arbitrating conflicts between CPUs attempting to access the shared registers at the same time. Generally, in the case of conflicts, priority is set according to the number of the CPU requesting access.

When a CPU requests access to the shared registers as provided by CIP instruction register 12, issue control 16 generates an output signal 30 to all the other issue control circuits in the other CPUs indicating that shared register access is being requested by the CPU. If there are no conflicts, issue control 16 generates a CPU in progress signal 32 which is received by the decode control byte control circuit 70 (FIG. 2), and which, in turn, can determine which CPU is accessing the shared register. Each issue control circuit 16 receives the output signal 30 from each of the other issue control circuits as an input 34 whereby it can determine if a conflict exists, and how to resolve it depending on the CPU requesting access. For simultaneous requests, the lower the CPU number the higher the priority (CPU0 has highest priority). However, a CPU is prevented from setting its request signal if a CPU with a higher number has a request already set. Once a request line sets, it stays set until the circuit 10 has completed its function, for example, until the data is transferred in a write operation, or in the case of a read operation, until the control information including the register address is transferred to circuits 75.

Once a CPU has obtained access to the shared registers, generate control byte circuit 40 is activated by issue control 16 to generate, in accordance with the particular operation specified in the CIP register, a byte of control logic which is received by decode control byte circuit 70 and used by that circuit to control and accomplish the sought after operation. This control byte is forwarded through selector gate 44 to each of the decode control byte circuits 70 associated with each of the other processors and in addition to the decode control byte circuit 70 associated with the same CPU. The circuitry of FIG. 2 is also replicated for each processor in the system wherein each processor has one copy of the circuit.

The first clock period of every shared register operation is initiated by the distribution of a control byte from the accessing processor to all of the decode control byte circuits 70 in each of the CPUs in the system. The distribution of this control byte is accomplished according to a scheme that is necessitated by the manner in which the shared registers are located in the circuitry of the system. Accordingly, this organization will be discussed before proceeding further.

As mentioned above, each above, each CPU includes a copy of the shared register resource circuit 75. To accomplish the desired engineering goal that each CPU have substantially identical circuitry, the global shared registers 100 are physically distributed throughout the CPUs wherein each CPU includes a segment of the shared registers. The shared registers, as is in the case of the above referenced patents, preferably include eight B registers, eight T registers and a 32 bit semaphore register for each cluster in the system. As provided in the above-referenced patents, the present invention also provides for N+1 clusters of these registers. In the case of the present invention, the system is adapted to an eight processor CPU system, although the invention is in no way limited to such number. The shared registers 100 are distributed as follows: each of the global shared register circuits 100 holds one-eighth of the total shared register resource. More specifically, each "word" stored in a shared register is 64 bits wide. The shared register circuits are distributed such that for every 64 bit word memory location, the shared register circuit in each CPU holds one eight bit byte of the 64 bit word. Accordingly, each of circuits 10 has one eight bit wide path to each of the shared register resource circuits 75 of FIG. 2 in each of the other CPUs, as well as one path directly to its own global shared register resource circuit 75. The first of these paths is connected to carry eight bits of the 64 bit wide output 45 (and input 46) to one of the other circuits 75, the second connected to the carry the next eight bits to a second one of the circuits 75, and so on. These eight eight-bit wide paths are designated 72 in the drawing of FIG. 2.

Accordingly, for example, if a CPU has gained access to the shared registers to write a 64 bit word into one of the global shared register locations, decode control byte circuit 70 provides an output signal 76 to the select CPU gate 78, which selects the CPU path for the CPU that is generating the 64 bit word output data 45. All the circuits of FIG. 2 thus simultaneously receive one of the eight eight-bit bytes of the 64 bit word wherein shared register write data latch 82 receives an eight bit byte for storage in the shared registers 100. Similarly, in a read operation, each shared register read data latch 86 receives one eight bit byte of the 64 bit word from the shared registers 100 and outputs it on the eight bit CPU path. In the case of the output path, shared register read data 86 merely provides that the eight bit byte is placed on all paths simultaneously, because only the CPU performing the operation will read it, as received on the 64 bit path into shared register read data latch 46.

With the organization of data paths between the circuits of FIG. 1 and FIG. 2 and the organization of the shared registers now described, the distribution of control bytes throughout the system will be described. Each control byte comprises eight bits. This byte is generated by generate control byte circuit 40 and is passed through selector gate 44 under the control of selector signal 33 from issue control 16. Generate control byte circuit 40 produces eight replications of the control byte on a 64 bit wide path at is its output 41, which is forwarded to latch 45. As determined from the CPU in progress signal received by decode control byte logic 70, the select CPU gate 78 in each shared resource circuit 75 selects the path associated with the CPU controlling the shared register access, wherein each shared register write data latch 82 of each of the circuits of FIG. 2 in each of the CPUs simultaneously receives one copy of the control byte generated by generate control byte circuit 40. This control byte is received by decode control byte circuit 70 over path 83 from the write data latch 82. The decode control byte circuit 70 of each of the CPUs thus each simultaneously receives the control information necessary to control the shared register access and, in particular, the addressing of the shared registers in the shared registers circuit 100.

An example of an operation in the shared register resource 75 will be described. As mentioned above, shared register access is typically initiated with a test and set instruction received by the CIP register 12. In response to the receipt of such a test and set instruction, issue control 16 checks the local copy of the semaphore bits in semaphore register 18. If the bit is clear, issue control 16 proceeds in order to set the selected bit in the global or common semaphore register for its cluster assignment which is held in the shared registers resource 100. To do so, issue control 16 first requests access to the shared registers and, if obtained, generates an in progress signal which reserves the shared register resource to the CPU and which indicates to the other decode control byte logic 70 which CPU is in control whereby the appropriate CPU paths can be selected. In the case of a test and set instruction, the bit to be set is encoded in the control byte generated by control byte circuit 40, which byte is forwarded to each of the circuits of FIG. 2 whereby decode control byte logic 70 provides that the selected bit is set in the shared registers 100. It should be realized, however, that the selected bit will be found in only one of the shared register segments held in the shared registers 100 of the shared register resource circuits 75 even though all decode control byte circuits 70 will receive the set instruction. In addition, each decode control byte logic 70 generates a control signal 71 to set the corresponding bit in the local semaphore register 18 in that CPU if that CPU is in the same cluster, as received on input line 17 in the circuit FIG. 1.

Operations to write data from the shared registers are accomplished in similar fashion beginning with the distribution of a control byte to each of the circuits of FIG. 2, but are followed on the next succeeding clock period by the forwarding of data from one of the selected processor paths $A_I$, $S_I$ or $A_J$ as selected by selector gate 44. Each of these processor paths are 64 bits wide and are latched into latch 45, which distributes the words in eight bit bytes to the various circuits of FIG. 2 as hereinbefore described. This operation is illustrated in FIGS. 3A and 3B, which show that in the first clock period of a write operation, the control byte is distributed to each of the circuits decode control byte and on the second clock period that each of the circuits 70,75 receives the data to be written into the shared register 100. The address for the write operation being provided for by the control byte. Read operations proceed in a similar fashion, wherein data from the shared registers 100 is selected by selector gate 90. The data read out of the shared registers is received by the input latch 46 of the CPU accomplishing the operation, which passes it to a selector gate 60, which, in turn, fans the data out to the $A_I$ and $S_I$ data paths connected directly to the CPU.

The shared register system of the present invention also provides access to I/O channels. Accordingly, each of the shared register resource circuits 75 includes the full capability to individually control the I/O channels associated with its processor. Each circuit 75 can thus generate I/O control signals (from decode control byte logic 70), and an I/O address. Since each I/O address is 32 bits wide, and because only eight bits of the address can be sent from a particular local access circuit 10 to a circuit 75 eight bits at a time, a multiplexing scheme is provided whereby the address can be sent in four consecutive clock periods. Referring again to FIGS. 3A and 3B, there is shown that an I/O operation initiates as in the case of other operations, with the distribution of a control byte on the first clock period to each of the other circuits 75. On the second clock period, the $A_J$ data path is selected by select gate 44 and sent to the write data latch 45, from where it is distributed to the circuit 75 controlling the I/O operation. $A_J$ indicates the I/O channel number and consequently which circuit 75 is activated to control the selected I/O channel. On the third, fourth, fifth and sixth clock periods, there is consecutively sent on each clock period eight bits of the I/O address. To provide that the I/O address is multiplexed out on consecutive clock periods, a multiplexer circuit 47 is provided in circuit 10, and receives the full 32 bit wide address on path $A_K$ directly from the CPU in control. On the first clock period, multiplexer 47 gates through the first eight bits of the address, on the second clock period, the second eight bits of the address and so on and so forth, through the select gate 44. A demultiplexer circuit 92 is provided in shared register resource circuit 75 to receive the I/O address eight bits at a time and thereafter present at its output a full 32 bit wide I/O address. A similar provision for multiplexing and demultiplexing I/O addresses is provided by circuits 93 and 50 wherein an I/O address can be received from the I/O channel and returned to a processor. Accordingly, it is seen that each circuit 75 of FIG. 2 is capable of individually controlling the I/O channels for its associated processor (a processor typically has two or more I/O channels that can be controlled by its associated circuit 75).

Another feature of this system of the present invention is a provision of a real time clock 120 in circuit 10, the output of which may be read by the associated process via select gate 60. Real time clock 120 may be loaded either through an output from the shared registers, or directly from the $S_J$ data path of the processor, through select gate 122.

For the sake of brevity, the description of the invention has been limited to those features substantially unique to its particular implementation of the shared register schemes described in the above referenced U.S. patents. Further details of controlling access to and assigning processors to particular clusters of shared registers are found in these patents. Furthermore, the system of the present invention is preferably implemented to include the deadlock interrupt scheme set forth in the referenced patents including deadlock interrupt capabilities to prevent a CPU from awaiting the clearing of a particular semaphore bit when there is no other processor in the semaphore bit cluster capable of clearing the bit.

Although the invention has been described herein in its preferred form, those skilled in the art will recognize that various modifications and changes may be made thereto without departing from the spirit and the scope of the claims appended hereto.

We claim:

1. An interprocessor communication system for a multiprocessor data processing system, comprising:

(a) a common shared resource circuit including a plurality of clusters, each cluster including a common semaphore register and a plurality of common information registers;

(b) the common shared resource circuit further including access control means for limiting access by each processor to the registers within a single cluster;

(c) each processor including means for issuing instructions to access the common semaphore and information registers in said common shared resource circuit;

(d) local control means connected to each processor and in relatively close proximity to its respective processor as compared to said common shared resource circuit, wherein said local control means includes a local semaphore register, means for updating the contents of the local semaphore register in response to changes in one of the common semaphore registers and issue control means for monitoring and controlling the issue of instructions requiring access to said common shared resource circuit from the processor; and (e) each of said local control means further including data control means for the transfer of data from its respective processor to a common register or from a common register to its respective processor and control packet means for developing a control packet based on an issued instruction from its respective processor, said control packet being sent to said common shared resource circuit in order to gain access to said common shared resource circuit by the processor.

2. The interprocessor communication system according to claim 1 wherein each local control means further includes a real time clock circuit accessible by its respective processor.

3. The interprocessor communication system according to claim 2 wherein each local control means further includes separate read and write data paths connected to said common shared resource circuit.

4. The interprocessor communication system according to claim 3 wherein each processor further includes address registers and scalar registers and each write data path includes multiplexer means for selectively placing the contents of one of said control packet means, said address registers and said scalar registers on said data path.

5. The interprocessor communication system according to claim 4 wherein the common shared resource circuit further includes I/O channel communication means for linking the common shared resource circuit to an I/O channel and the local control circuit further includes means to transfer address information to said I/O channel communication means.

6. A method of forming an interprocessor communication system for transferring data and synchronizing activity between processors in a multiprocessor data processing system of N processors, comprising the steps of:

providing a common shared resource circuit including shared semaphore registers and shared information registers, wherein the shared information registers are usable for holding data to be accessed by a processor and the shared semaphore registers are usable for controlling access to a shared information register and for synchronizing activity between two processors;

partitioning the common shared resource circuit into resource circuit blocks such that 1/N of the bits in each information register is placed in each block and a block is placed in relatively close proximity to each processor as compared to the other processors;

providing local control means connected to each processor, wherein said local control means is placed in relatively close proximity to its respective processor as compared to the remaining processors and said local control means coordinates communication between its respective processor and the common shared resource circuit; and providing interprocessor communication means for transferring commands and data between said local control means and said common shared resource circuit.

7. The method according to claim 6 wherein the method further comprises:

dividing said information registers into clusters;

assigning one of said semaphore registers to each cluster; and restricting access by each processor to those information and semaphore registers in their cluster.

8. The method according to claim 7 wherein the step of dividing the information registers into clusters further includes dividing the information registers into N+1 clusters, wherein each cluster contains the same number of information registers.

9. The method according to claim 8 wherein the step of dividing the information registers into clusters further includes restricting the number of information registers in each cluster to sixteen, wherein eight registers are used for scalar data and eight registers are used for address data.

10. A method of accessing data in an information register in a tightly coupled interprocessor communication system for a multiprocessor data processing system; wherein said communication system comprises a separate communications path, a common shared resource circuit connected to said path and distributed local control means connected to each processor and to the communications path for communicating and coordinating data transfer between said common shared resource circuit and the connected processor; wherein said common shared resource circuit includes shared semaphore registers and shared information registers and wherein said local control means includes a local semaphore register whose contents mirror the contents of an associated shared semaphore register, the method comprising:

testing a bit in the local semaphore register associated with the desired information register;

if the bit is set, waiting until the bit is cleared; and if the bit is not set, setting the corresponding bit in the associated shared semaphore register, accessing the desired register through the local control means and clearing the set bit.

11. An interprocessor communication system for a multiple processor computing system, comprising:

a shared information register;

a shared semaphore register including a bit used to control access to said shared information register;

a plurality of local circuits, wherein a local circuit is placed in close proximity and connected to an associated processor and wherein a local circuit includes:

a current instruction parcel register for receiving instruction parcels from the associated processor;

a real time clock;

a local semaphore register;

shared semaphore register monitoring means for monitoring changes in the shared semaphore register and reflecting those changes in the local semaphore register;

local semaphore testing means for testing a bit in said local semaphore register;

instruction issue control connected to said local semaphore testing means and to each of the other local circuits for monitoring requests for interprocessor communication from other local circuits and for enabling the issue of instructions from the current instruction parcel register as a function of the state of a bit tested in its local semaphore register and of the requests received from other local circuits; and control generation means connected to said current instruction parcel and said instruction issue control for converting issued instructions into a control parcel; and interprocessor communication means connected to said plurality of local circuits, said shared information register and said shared semaphore register for transferring a control parcel from one of said local circuits to said shared registers in order to perform one of a group of functions including:

reading the shared information register;

writing the shared information register; and loading the contents of the semaphore register into the local semaphore register.

12. The interprocessor communication system according to claim 11 wherein the system further comprises I/O channel means connected to said interprocessor communication means for reading and writing to an I/O channel.

* * * * *